(12) United States Patent
Yu et al.

(10) Patent No.: US 9,050,969 B2
(45) Date of Patent: Jun. 9, 2015

(54) TRIP ORIENTED ENERGY MANAGEMENT CONTROL

(71) Applicant: Ford Global Technologies, LLC, Dearborn, MI (US)

(72) Inventors: Hai Yu, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 13/711,397

(22) Filed: Dec. 11, 2012

(65) Prior Publication Data

US 2014/0163789 A1 Jun. 12, 2014

(51) Int. Cl.
*B60W 20/00* (2006.01)
*B60W 10/06* (2006.01)
*B60W 10/08* (2006.01)

(52) U.S. Cl.
CPC ............. *B60W 20/00* (2013.01); *B60W 20/106* (2013.01); *B60W 10/06* (2013.01); *B60W 10/08* (2013.01); *Y10S 903/93* (2013.01); *B60W 2710/244* (2013.01); *B60W 20/102* (2013.01)

(58) Field of Classification Search
CPC . B60W 20/00; B60W 20/104; B60W 20/106; B60W 20/108
See application file for complete search history.

(56) References Cited

U.S. PATENT DOCUMENTS

| | | | |
|---|---|---|---|
| 2006/0278449 A1* | 12/2006 | Torre-Bueno | 180/65.2 |
| 2009/0321159 A1* | 12/2009 | Andri | 180/65.25 |
| 2011/0166732 A1 | 7/2011 | Yu | |
| 2011/0166733 A1 | 7/2011 | Yu | |
| 2011/0172867 A1 | 7/2011 | Yu | |

\* cited by examiner

*Primary Examiner* — Helal A Algahaim
*Assistant Examiner* — Genna Mott
(74) *Attorney, Agent, or Firm* — David B. Kelley; Brooks Kushman P.C.

(57) ABSTRACT

An engine, electric machine and battery of a vehicle are operated such that a state of charge of the battery generally decreases and then achieves approximately a charge-depletion-to-charge-sustaining transition threshold after the vehicle has been driven a distance greater than the pure electrical range of the vehicle.

12 Claims, 9 Drawing Sheets

TRIP ORIENTED ENERGY MANAGEMENT CONTROL

TECHNICAL FIELD

The present disclosure is related to electric energy management in a plug-in hybrid electric vehicle.

BACKGROUND

Plug-in Electric Hybrid Vehicles (PHEV) are an extension of existing hybrid electric vehicles (HEV) with added energy flexibility. Traditional HEVs buffer fuel energy and recover kinematic energy in electric form to improve the overall vehicle system operating efficiency. Fuel is typically the only source of energy in an HEV. A PHEV utilizes a larger capacity battery pack than a standard HEV and the PHEV has two sources of energy, fuel and electricity from the electric utility grid. Fuel is typically more expensive but readily available while driving due to existing infrastructure. Electricity is less expensive but limited by battery capacity and charge state. This additional source of energy supply adds complexity to the control system strategy. The control system can bias the PHEV towards electrical propulsion to increase fuel efficiency.

The energy economy of a PHEV is derived from the PHEV system design, extended energy storage system, and the PHEV energy management control strategy. The PHEV energy management control (EMC) strategy is generally similar to that of HEVs, with the main objective of minimizing energy operational costs and emissions without compromising the vehicle drivability and system constraints. A standard EMC strategy is traditionally designed to operate the PHEV in electric drive (EV) mode or to maximize the battery power output in blended operation mode before the next plug-in recharge event. The added electric energy supply and its more frequent recharge expectations increase the complexity of the PHEV energy management problem thus making the solution more challenging and complicated.

SUMMARY

A plug-in hybrid electric vehicle may include an engine, an electric machine, a battery, and at least once controller. The at least one controller may operate the engine and electric machine such that a state of charge of the battery achieves approximately a charge-depletion-to-charge-sustaining transition threshold after the vehicle has been driven a distance greater than a pure electrical range of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The PHEV energy optimization has multiple different paths; a few different paths will be discussed in this disclosure. One of those methods applies dynamic programming (DP) to determine the optimal powertrain operating states and the energy consumption distribution between the fuel and the electricity based on detailed trip knowledge. Due to its non-causal nature and heavy computation loads, the DP based PHEV energy management control strategy is typically evaluated offline where the energy economy potential can be explored and optimized. The insights obtained from a DP control process can serve as a guideline for many alternative methods including rule based control design and calibrations. There has been research comparing the performance of an electric-centric charge-depleting hybrid vehicle control strategy with a near-optimal dynamic programming-optimized control strategy. Another path utilizes online/real-time implementable PHEV energy management control rules. One method is the Equivalent Consumption Minimization Strategy (ECMS). This strategy utilizes the concept of instantaneous equivalent fuel consumption. Theoretically based on Pontryagin's Minimum Principle, this method provides a metric such that the fuel energy consumption and the battery electric energy consumption can be evaluated simultaneously towards a global optimization objective. There are a few known strategies like an adaptive ECMS control strategy that incorporated real-time driving cycle information into the adjustment of the ECMS control setpoint and a stochastic optimal control based PHEV energy management strategy. These are based on DP and may realize an optimal energy management process using detailed trip knowledge for one specific trip. The result, however, can not be applied online to real world driving cycles. The afore-mentioned implementable energy management methods assume either no trip foreknowledge or just short range preview information. The result is that their optimality in control is only valid with respect to an averaged operator usage and driving patterns.

Based on optimal control theory, this disclosure relates to a Trip-Oriented Energy Management Control (TEMC) strategy that includes optimizing the trip specific PHEV energy economy based on scalable trip foreknowledge. This TEMC strategy covers the gap between the DP and the rule based methods by providing a systematic control architecture that is able to optimize PHEV energy management using limited available trip information. The trip oriented energy management problem can be solved at two levels of optimization. At the higher level, i.e., the trip domain optimization, a global energy usage/consumption optimization is carried out such that the battery electric energy and the fuel usage is preplanned based on scalable trip foreknowledge and energy storage states. An optimal battery SOC depletion/usage profile is generated. The trip domain SOC profile serves as a feed forward guideline for the PHEV online energy management control towards global energy economy improvement over a given driving schedule. Next, the trip specific optimal fuel consumption to electricity depletion ratio index is adaptively searched online through a feedback control mechanism such that the overall controlled energy consumption process achieves approximately the preplanned optimal process. At the vehicle system level, the most efficient PHEV system power split state and power sourcing state are optimally resolved for a specific PHEV with respect to vehicle states, system constraints and the trip domain energy consumption ratio index.

It may be desirable to have an optimized solution that relies on knowledge about the operator's energy usage patterns and driving patterns. This data, however, is not always available. One goal of the PHEV energy management optimization objective may be to optimize the system efficiency with minimized operating power loss. It may also be desirable to find an operator usage oriented solution that optimizes the system operation and the energy consumption comprehensively. Certain examples herein focus on the trip domain feedback control and the vehicle domain system optimization. The generation of the battery SOC profile used in this disclosure discusses the minimum level of trip foreknowledge being trip distance until next charge, but the SOC profile is not limited to trip distance and may include other trip characteristics such as route characteristics, real-time data, driver characteristics, or desired driver behavior. The route characteristics include but are not limited to map information like road type (highway, city, etc.) posted speed limits, and road grade, which is a directional change in elevation. The real-time data includes but are not limited to traffic, construction, accidents, weather, and lane closures. The driver characteristics include but are not limited to historical driver patterns, a determination if a commute is based on day of the week and time of day. The driver desired behavior includes but is not limited to driver input (performance, economy, city, etc.) or driver demand. A PHEV energy management strategy that incorporates the trip distance information can achieve better fuel economy by allowing an extended scale of system optimization.

Figure 1:
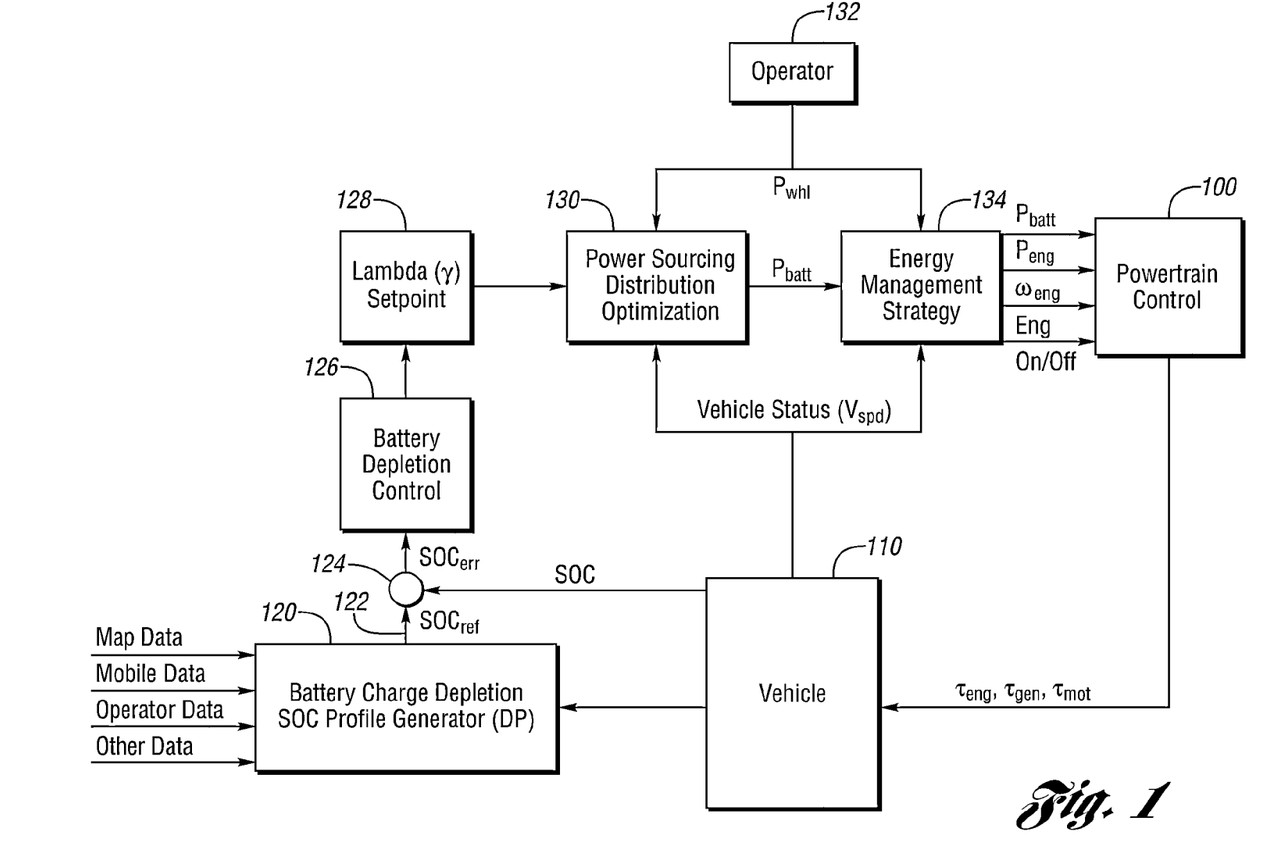
FIG. 1 is a trip oriented energy management control system flow diagram.

A trip oriented energy management control system is shown schematically in FIG. 1. The powertrain control (PCM) block 100 is based on a basic powertrain model such as:

$$J_{eng}\frac{d\omega_{eng}}{dt} = \tau_{eng} + T_{e2g}\tau_{sun}$$

$$J_{mot}\frac{d\omega_{mot}}{dt} = \tau_{mot} - \frac{T_1 T_2}{\varrho}\tau_{sun} - \frac{T_2}{T_g}\tau_{dft}$$

$$J_{gen}\frac{d\omega_{gen}}{dt}$$

In these equations, $J_i$ terms are inertias, $\tau_i$ terms are torques, $\omega_i$ is the rotational speed typically expressed in rpm, and $T_i$ terms are speed and torque transfer ratios between driveline components ($T_{e2g}$ is the gear ratio from engine to generator, $T_1$ is the gear ratio from counter shaft to ring gear, $T_2$ is the gear ratio from motor shaft to countershaft, $T_g$ is the gear ratio from drive shaft to counter shaft). This can also be evaluated using angular speed, which is typically expressed as rad/sec. (Subscript i=eng; mot; gen; dft; sun indicate the engine, electric motor, electric generator, driveshaft and sun gear respectively.) These equations cover specific electric machine implementations, namely an electric motor and an electric generator, but the concepts are not limited to those implementations. The engine, electric motor, and electric generator each have a maximum torque. The total torque available to provide vehicle propulsion is approximately $\tau_{eng}+\tau_{mot}$ minus driveline losses. When the vehicle is operated at a point greater than $\tau_{mot}$, then both the engine and motor can be operated to achieve the desired torque. If the desired torque is less than $\tau_{mot}$, then the motor alone may be used to provide the desired torque.

Figure 2A:
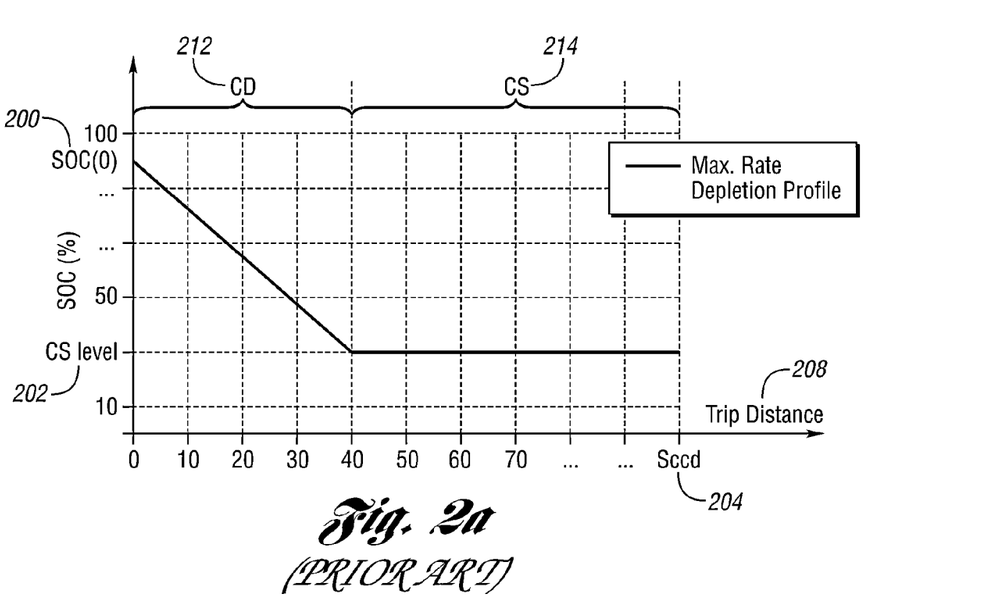
FIG. 2a illustrates an example plot of how battery state of charge varies with trip distance in a standard plug-in hybrid control strategy.
Figure 2B:
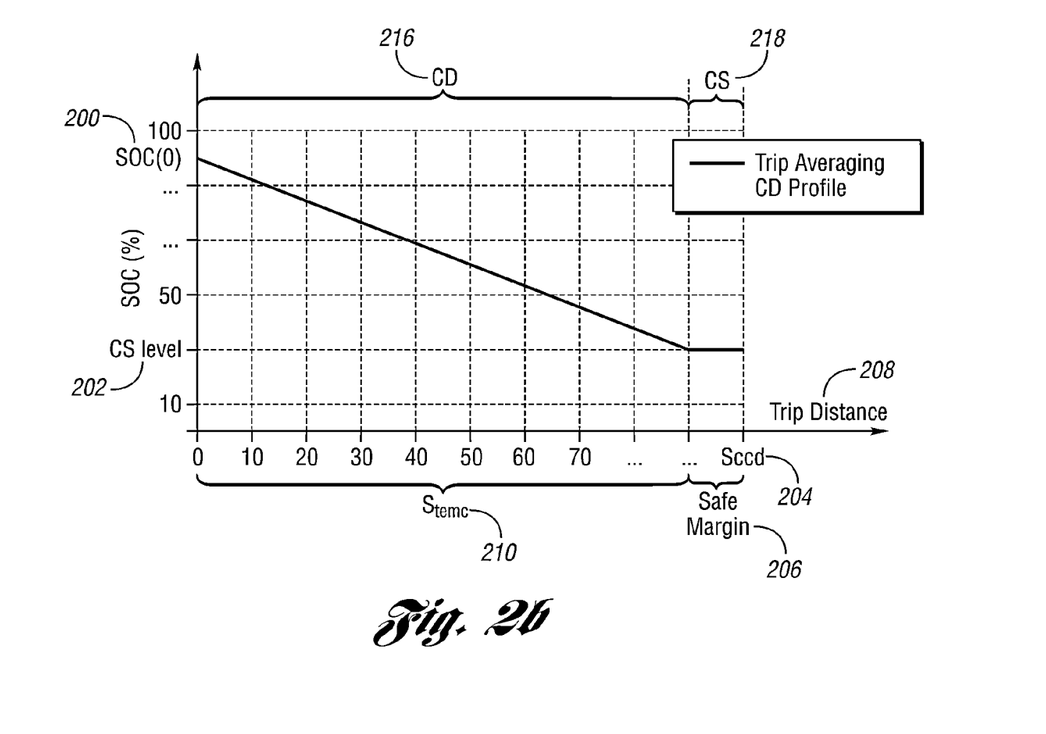
FIG. 2b illustrates an example plot of how battery state of charge varies with trip distance in a plug-in hybrid system controlled using a linear SOC profile constructed with respect to recharge cycle driving distance.
Figure 2C:
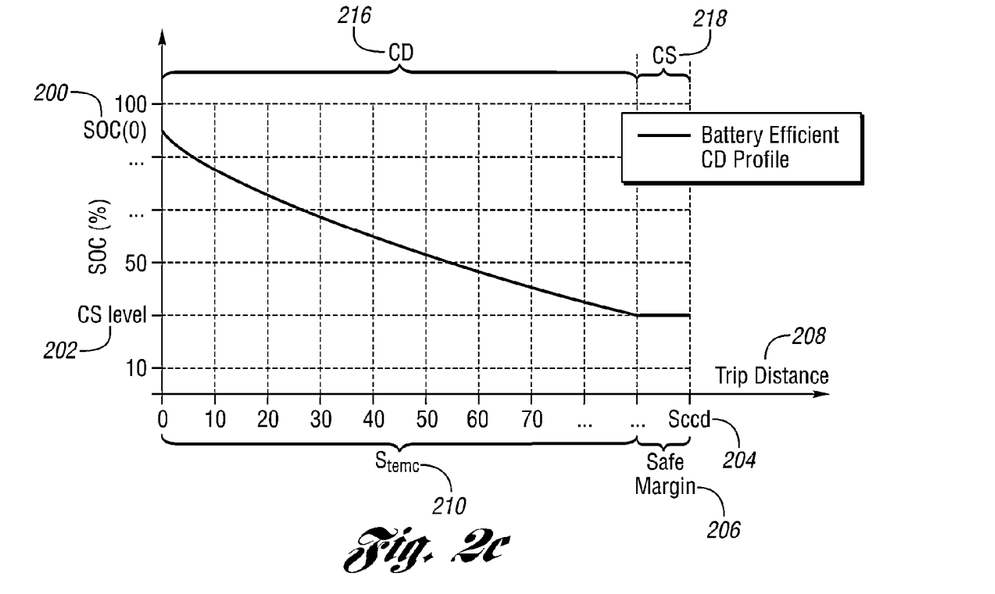
FIG. 2c illustrates an example plot of how battery state of charge varies with trip distance in a plug-in hybrid system controlled using a polynomial SOC profile constructed with respect to recharge cycle driving distance.

The requested torques $\tau_{eng}$, $\tau_{gen}$, $\tau_{mot}$ are communicated to the vehicle 110 and the vehicle operation data including but not limited to vehicle speed and distance traveled is communicated to the battery charge depletion profile generator (DP) 120, which generates a reference state of charge 122. The reference state of charge can be determined using multiple methods, such as linear, polynomial, preplanned piece wise linear, and preplanned continuous. The linear reference state of charge at a discrete trip location ($SOC_{ref\_lnr}(s)$) is illustrated in FIG. 2b and can be calculated as a linear equation using the following equation:

$$SOC_{ref\_lnr}(s) = SOC(s_0) - \frac{DOD}{S_{temc}}s$$

where s is the discrete trip distance 208, $SOC(s_0)$ is the state of charge at the discrete trip distance at the beginning of the trip 200, DOD is the depth of discharge which equals $SOC(s_0)-SOC(_{CS})$ 202, and $S_{temc}=S_{ccd}(1-k_{em})$ is the trip energy management control trip distance 210. $K_{em}$ provides a distance buffer to ensure battery depletion when reaching the recharge point 206, and $S_{ccd}$ is the total charge cycle distance 204. This reference state of charge can also be calculated as a polynomial equation as illustrated in FIG. 2c using the following equation:

$$SOC_{ref\_apr}(s) = \frac{\eta_\delta}{S_{temc}^{n-1}}(S_{temc}-s)^n + k_0(S_{temc}-s) + SOC_{CS}$$

$$k_0 = \frac{DOD}{S_{temc}} - \frac{\eta_\delta}{S_{temc}^2}$$

where, $\eta_\delta$ is the difference between the two extreme values of $\eta$ at a mean discharge power level in the battery depletion SOC range. $SOC_{cs}$ is the designed battery charge sustaining SOC level 202.

Figure 2D:
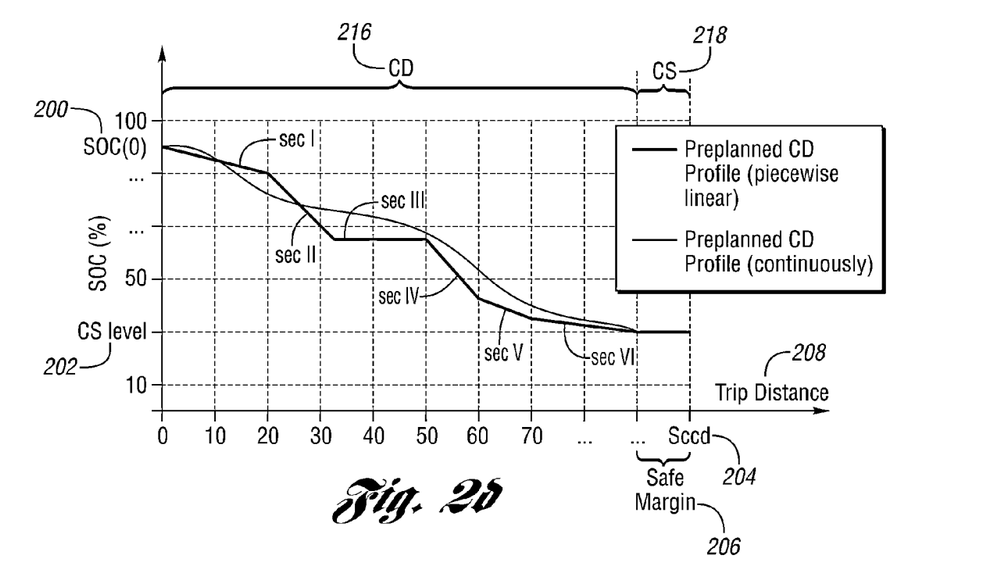
FIG. 2d illustrates an example plot of how battery state of charge varies with trip distance in a plug-in hybrid system controlled using a piecewise linear Charge Depletion SOC profile and a continuously calculated Charge Depletion SOC profile constructed with respect to recharge cycle driving distance.

The preplanned piecewise linear and continuously calculated reference state of charge at a discrete trip location (SOC$_{ref}$(s)) are illustrated in FIG. 2d.

In FIG. 1, the feedback control point 124 can be implemented many ways, for example, one method can be where the feedback control point is designed evaluating the instantaneous SOC error ($\epsilon_{SOC}$) as follows:

$$\Sigma_{SOC} = \text{sign}(SOC_{ref}(s) - SOC(s))$$

$$\max(|SOC_{ref}(s) - SOC(s)| - SOC_{cb}, 0)$$

where SOC$_{cb}$ defines an uncontrolled small vicinity around the reference SOC to reduce the control sensitivity. The change in energy consumption ratio $\Delta\lambda$ can be calculated in different ways, an example is calculated in the spatial domain in the Battery Depletion Control block 126 with the following equation:

$$\Delta\lambda = \lambda(k) - \lambda(k-1) = \text{Ctrl}_{fb}(\epsilon_{SOC})$$

where $\lambda(k)$ is the value of lambda in spatial domain control station $k\Delta s \leq s < (k+1)\Delta s$. $\Delta s$ is the station length and k is the unit of quantization. The control strategy starts with $\lambda(0)$ that is pre-calibrated with respect to the value of S$_{ccd}$ and other preview trip information if available. Ctrl$_{fb}$ represents a set of feedback control functions that can be designed with different tracking control methodologies. Since the SOC profile is continuous and typically slow in variation, multiple different control strategies may be employed, for example, a PID controller may be used for control with respect to battery SOC profile tracking. In the PID controller, the integration portion is trip domain integration and it is further limited with an anti-windup method. Another control strategy that may be used is a layer of fuzzy logic for variable control gain and control station length adjustments in order to adapt to different realistic driving patterns.

The value of $\lambda$ is determined from a setpoint and adjusted according to the $\Delta\lambda$ in block 128. The resulting value of $\lambda$ is utilized in the Power Sourcing Distribution Optimization (PSD) block 130 along with other data from the vehicle 110 and an operator 132, more details on this will be provided in FIG. 5 and FIG. 6. The output of block 130 is P$_{batt}$, which is utilized by the Energy Management Strategy (EMS) block 134. More details on block 134 will be provided in FIG. 7 and FIG. 8. The output of the EMS block 134 controls the PCM 100.

There are two basic operation states of a PHEV: charge depleting mode (CD) where the state of charge stored in the battery is depleted at a faster rate than it is replenished and charge sustaining mode (CS) where the state of charge stored in the battery is replenished such that the total state of charge is generally maintained at a specific level. There is a charge-depletion-to-charge-sustaining transition that occurs when the vehicle operating in charge depleting mode reaches the charge sustaining level 202. At this point in time, the vehicle operating mode transitions from charge depletion mode to charge sustaining mode. In the example shown in FIG. 2a, a mostly charged PHEV (shown at a level which is less than fully charged 200) is driven in the CD 212 state for the first part of the trip in which the battery's state of charge (SOC) exhibits a net decrease between SOC levels 200 and 202. Due to the lower cost of electricity compared to fuel, the available battery electric energy is used for vehicle usage function before the next PHEV plug-in recharge event to largely displace fuel consumption. Since knowledge of the occurrence of the next battery recharge event is usually unknown, by default, the PHEV operation starts with CD process to assure battery depletion before the end of the trip.

During the CD operating state, according to the base PHEV energy management strategy, the battery's electric energy is used primarily to propel the vehicle, thereby maximally or near maximally depleting the electric energy stored in the battery. By primarily utilizing the battery energy to propel the vehicle early in the trip, the PHEV fuel consumption is minimized when the trip distance is close to the Pure Electric Range (PER) in EV/PEV (electric vehicle operation or in blended operation in which the internal combustion engine is used as little as possible) operations. Fully-charged PHEVs have, for example, a 10-40 mile PER in certain driving cycles, with the PER depending on the design goals, the size of the battery pack, and driving cycles. During the driving period shown as S$_{ccd}$ 204 in FIG. 2a, the vehicle is operating in either the Maximum Charge Depletion (CD) 212 or the Charge Sustaining (CS) 214 state. At time zero 200, the controller operates the system at the maximum charge depletion rate 212 until the SOC reaches a threshold level 202. Upon reaching the threshold level 202, the controller operates the system in a charge sustaining state (CS) 214 for the remainder of the trip S$_{ccd}$ 204.

An alternative power management strategy for PHEVs has the potential to allocate driver power demand between the two propulsion devices in a more optimally balanced way than either maximum charge depletion or charge sustaining states. During the driving period shown as S$_{ccd}$ 204, the vehicle is operating in either the Maximum Charge Depletion (CD) 216 or the Charge Sustaining (CS) 218 state (shown in FIG. 2b, FIG. 2c, and FIG. 2d). By providing or assuming knowledge of the total distance that the PHEV plans to travel before the next battery charge event, the new PHEV battery operating state is extended resulting in a Charge Depletion (CD) state 216 (shown in FIG. 2b, FIG. 2c, and FIG. 2d), which extends the battery charge depletion state to the entire S$_{ccd}$ 204 or to a segment S$_{ccd}$—Safe Margin 206 of a trip by replacing the CD plus CS process (shown in FIG. 2a). During the extended CD state 216, the PHEV powertrain is managed in a blended operating mode in which the engine and the battery are optimally coordinated in satisfying the drive power demand (torque demand) based on the control strategy examples provided in FIG. 2b, FIG. 2c, and FIG. 2d. The drive power allocation to both energy sources is dynamically adjusted in order to achieve an optimum Energy Consumption Ratio (ECR) that minimizes the Fuel Consumption Rate (FCR) with respect to the Electricity Depletion Rate (EDR). The fuel consumption rate may be based on distance or time and the electricity depletion rate may be based on distance or time. As a result, the battery SOC under the controlled process follows a desired reference SOC profile in the spatial domain (see FIGS. 2b, 2c, and 2d). The reference SOC profile may be designed with scalable trip information depending on availability. At the minimal level, the drive distance between consecutive battery charges is required. This battery SOC profile not only assures battery depletion to the CS level before the end of trip S$_{ccd}$, but also dictates the battery power along the trip by the ECR along the reference SOC profile. The battery SOC profile can be designed for fuel economy improvement, battery protection, battery durability maximization, energy conservation, or the like. The battery SOC profile may be linear (FIG. 2b), curvilinear, polynomial (FIG. 2c), stepped, or exhibit any other combination of declines and/or constant holds (FIG. 2d). Without loss of generality, the reference SOC profile primarily discussed in this disclosure is designed for fuel economy improvement by assuming charge cycle distance information knowledge a priori.

Figure 3:
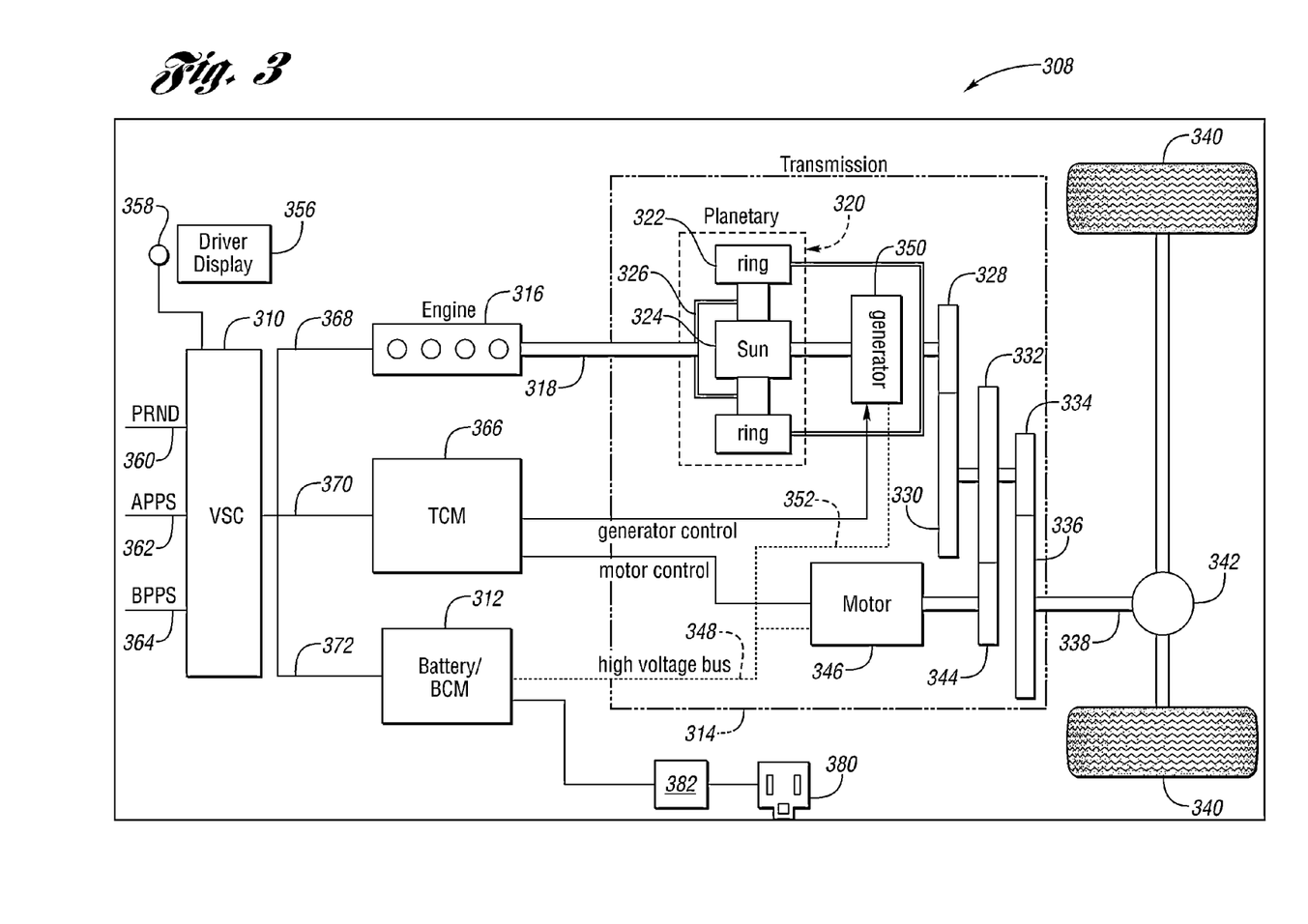
FIG. 3 is a schematic drawing of an example plug-in hybrid powertrain system configuration.

A power split PHEV configuration is illustrated in FIG. 3. This, however, is for example purposes only and not intended to be limiting as the present disclosure applies to PHEVs of any suitable architecture. The control of vehicle 308 can have various configurations. In the example shown in FIG. 3, a vehicle system controller 310 communicates with a battery and battery control module 312, and a control module 366 for a transmission 314. An engine 316, controlled by controller 310, distributes torque through torque input shaft 318 to transmission 314.

The transmission 314 includes a planetary gear unit 320, which comprises a ring gear 322, a sun gear 324, and a planetary carrier assembly 326. The ring gear 322 distributes torque to step ratio gears comprising meshing gear elements 328, 330, 332, 334 and 336. A torque output shaft 338 for the transaxle is drivably connected to vehicle traction wheels 340 through a differential-and-axle mechanism 342.

Gears 330, 332 and 334 are mounted on a countershaft, the gear 332 engaging a motor-driven gear 344. Electric motor 346 drives gear 344, which acts as a torque input for the countershaft gearing.

The battery of module 312 delivers electric power to the motor through power flow path 348. Generator 350 is connected electrically to the battery and to the motor in known fashion, as shown at 352.

In FIG. 3, the vehicle system controller 310 receives input including but not limited to a transmission range selector input signal 360, an accelerator pedal position sensor input signal 362, brake pedal position sensor input signal 364, and distance until next recharge 358. The vehicle system controller 310 outputs signals which are connected electrically to the engine 316, a transmission control module 366, and the battery/BCM 312 in a known fashion, as shown at 368, 370, 372. VSC 310 also outputs information to a driver information console 356 to inform the operator of the system operation.

As mentioned previously, there are two power sources for the driveline. The first power source is a combination of the engine and generator subsystems, which are connected together using the planetary gear unit 320. The other power source involves only the electric drive system including the motor, the generator and the battery, wherein the battery acts as an energy storage medium for the generator and the motor.

As mentioned above, a plug-in hybrid electric vehicle (PHEV) is an extension of existing hybrid electric vehicle (HEV) technology, in which an internal combustion engine is supplemented by an electric battery pack and electric machines to further gain increased mileage and reduced vehicle emissions. A PHEV utilizes a larger capacity battery pack than a standard hybrid vehicle and adds the capability to recharge the battery from a standard electrical outlet to decrease onboard fuel consumption to further improve the vehicle's fuel economy in the electric driving mode or in the fuel/electricity blended driving mode. Referring to FIG. 3, if HEV 308 is a PHEV, it includes a receptacle 380 which is connected to the power grid or outside electrical source and coupled to battery 312, possibly through a battery charger/converter 382.

In some applications, the vehicle further includes a system input or user input device such as button 358, a keyboard, a wireless interface input, or other input mechanism to provide to the VSC 310 the expected/estimated driving distance to the station of the next battery charge event. Furthermore, PHEV 308 may include a driver display 356 that provides information, e.g., GPS output, as well as an interface into which the driver may provide route information or request additional information. These information systems provide perceived or predicted trip information, such as distance until next charge (DUC), driving patterns, driver power profile, etc., to the PHEV control strategy.

Conventional HEVs buffer fuel energy and recover kinematic energy in electric form to improve the overall vehicle system operating efficiency. The fuel is the only energy source. For PHEVs, there is an additional source of energy—the amount of electric energy deposited in the battery from the grid during battery charge events. A power management strategy for PHEVs has the potential to allocate the drive power demand between the two energy sources to achieve better fuel economy or improved drivability while still satisfying the other objectives. While conventional HEVs are operated to maintain the battery state of charge (SOC) around a constant level, PHEVs use as much pre-saved battery electric (grid) energy as possible before the next battery charge event, i.e., it is desirable to fully use the relatively cheap grid supplied electric energy after each plug-in charge event. After the battery SOC depletes to a lowest conservative level, the PHEV operates as a conventional HEV operating about the lowest conservative level for the battery.

Figure 4A:
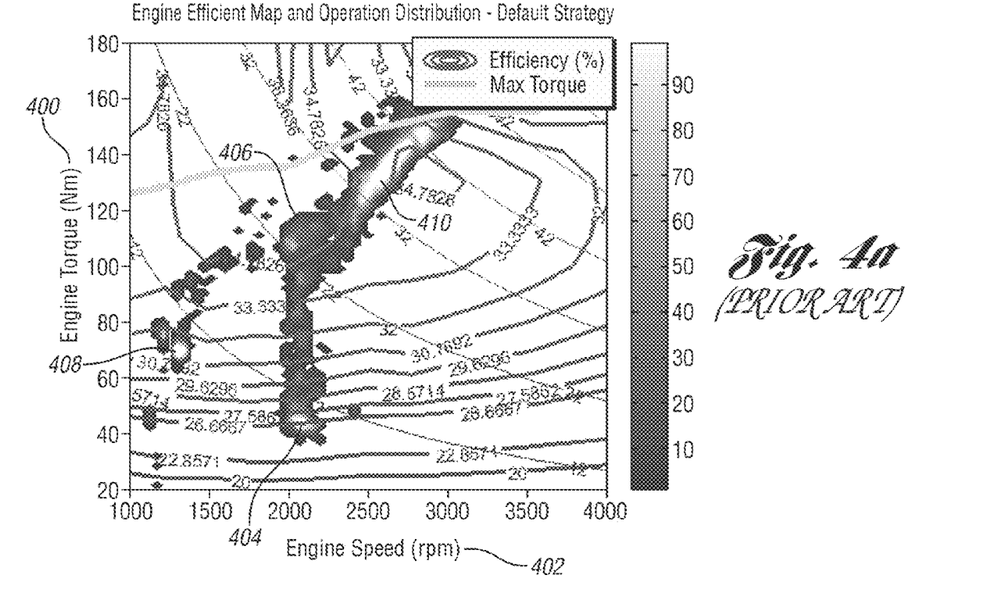
FIG. 4a illustrates an example engine efficiency map in relation to engine speed versus engine torque for a PHEV.

FIG. 4a illustrates a sample distribution of engine efficiency map and engine operation distribution based on a PHEV system utilizing a standard control strategy. The engine efficiency map and engine operation distribution are plotted as a function of engine torque 400 and engine speed 402. The engine speed is shown from 1000 rpm to 4000 rpm and the engine torque is shown from 20 Nm to 180 Nm. In this illustration, the engine is shown to cluster operation at multiple locations; one cluster is around 2000 rpm when the engine torque is approximately 40 Nm resulting in approximately 26% engine efficiency 404. Also, at 2000 rpm there is a range of operation from the cluster at 40 Nm 404 to the operation approximately at 120 Nm 406. Another cluster of operation occurs at approximately 1400 rpm when the engine torque is approximately 70 Nm, resulting in approximately 31% engine efficiency 408. A third cluster of operation occurs when the engine speed is 2500 rpm and the engine torque is around 130 to 140 Nm, resulting in operation efficiency of approximately 34% 410. During this standard operation, the engine efficiency is shown to drop to as low as 24%.

Figure 4B:
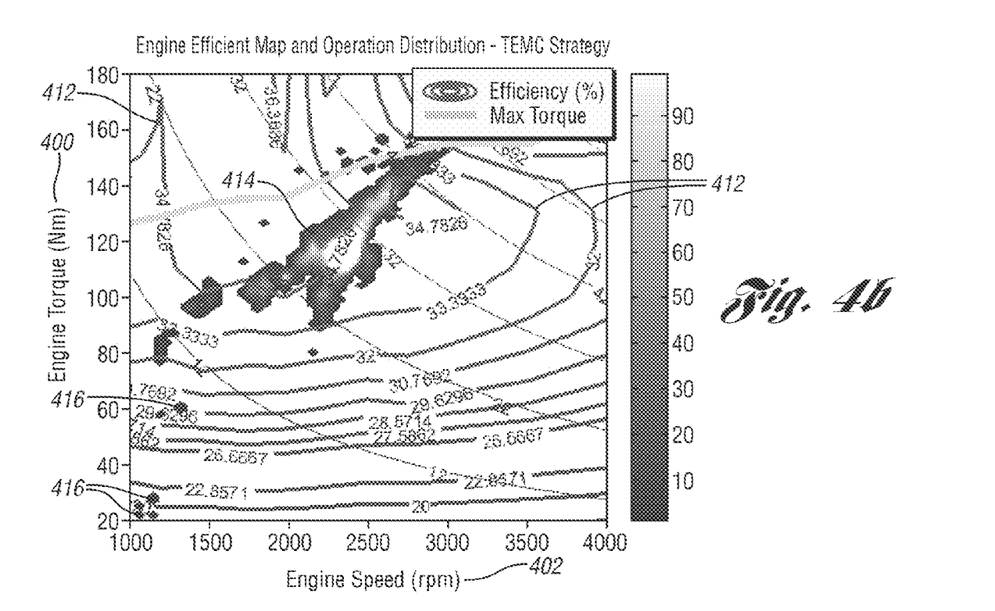
FIG. 4b illustrates another example engine efficiency map in relation to engine speed versus engine torque for a PHEV.

FIG. 4b illustrates a sample distribution of engine efficiency map and engine operation distribution based on a PHEV system utilizing the Trip-Oriented Energy Management Control Strategy (TEMC) control strategy. The engine efficiency map and engine operation distribution are plotted as a function of engine torque 400 and engine speed 402. The engine efficiency follows contours 412 and the engine operation is plotted as a histogram in which a single point is a dark point which gets lighter with increased occurrence 414. The engine speed is shown from 1000 rpm to 4000 rpm and the engine torque is shown from 20 Nm to 180 Nm. In this illustration, the engine is shown to cluster operation around 2400 rpm when the engine torque is approximately 120 Nm, resulting in approximately 34.7% engine efficiency 414. There are also points of operation which are statistically insignificant as they are outliers with a low occurrence 416. Using this TEMC control strategy, the operating efficiency is mainly focused around 34% efficient as illustrated by the high concentration of points at approximately 2500 rpm and 120 Nm 414. This data illustrates the improved efficiency of the TEMC control strategy.

Figure 5:
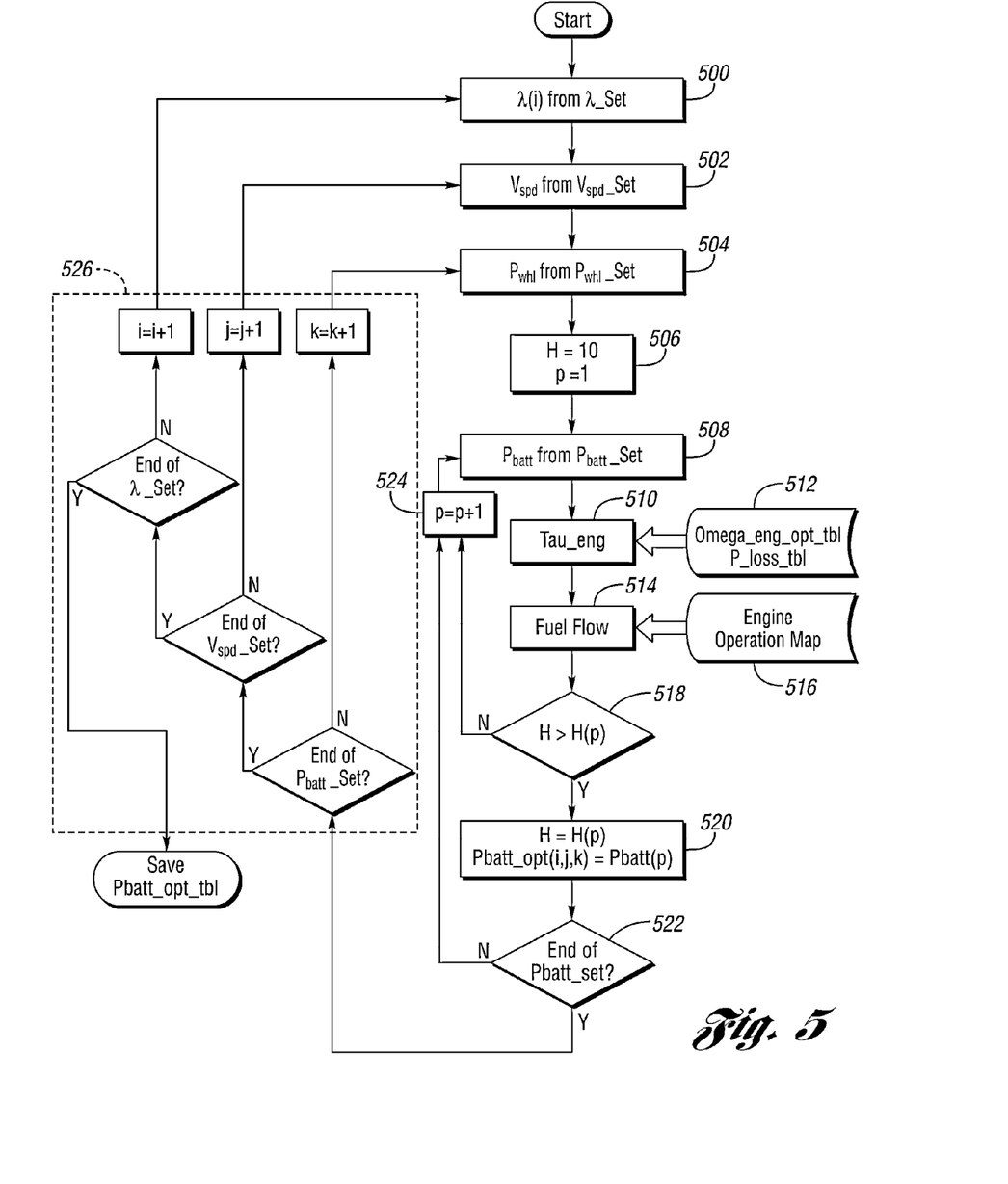
FIG. 5 is a power sourcing distribution optimization flow diagram.

FIG. 5 illustrates an example embodiment for calculating the Power Source Distribution Optimization 130 from FIG. 1. This example illustrates an example flow for generating a series of map tables which can be generated offline and then accessed quickly to improve run time performance or they can be calculated real-time. In FIG. 5, a combination of state points include but is not limited to the optimized costate $\lambda$ 500, which can be either the instantaneous value of $\lambda$ or it can be a value of λ from a set of permissible values so that a table can be calculated, vehicle speed $V_{spd}$ 502, which can be either the instantaneous value of $V_{spd}$ or it can be a value of $V_{spd}$ from a set of permissible values so that a table can be calculated, and operator drive power request $P_{whl}$ 504, which can be either the instantaneous value of $P_{whl}$ or it can be a value of $P_{whl}$ from a set of permissible values so that a table can be calculated and SOC. In block 506, the Hamiltonian value H is set to an arbitrary high value, for example H=10, and a candidate battery power $P_{batt}$ is chosen from the admissible battery sets 508, for example p=1.

The optimal engine speed and associated electrical power loss can be calculated in 510, or the value can be selected from a system operation optimization table 512. In block 514, the fuel flow is calculated based on variables including but not limited to engine speed and engine torque, or the fuel flow can be determined via the use of a static engine operation map 516.

The Hamiltonian is calculated using the following equation:

$$u^*(s) = \arg\min_{u|\omega^*_{eng}\in C} H(s)\bigg|_\lambda = \arg\min_{u|\omega^*_{eng}\in C}\left(\dot{m}^s_f(u) + \frac{\lambda}{\eta(x)}\frac{u}{Q_{batt}v_{veh}V^h_{oc}}\right)\bigg|_{\omega_{dft},T_{dft}}$$

where the PHEV power sourcing optimization has to be carried out with respect to a given value of the Fuel Consumption Rate (FCR) to Electricity Depletion Rate (EDR), which is the Energy Consumption Rate (ECR) referred to as λ, u*(s) is the optimal trip domain battery power trace, $\omega^*_{eng}(s)$ is the corresponding system operating setpoint, the steady state control input $u(s)=P_{batt}$, η is defined as the equivalent battery discharge power efficiency representing the useful battery power ratio to the total battery power consumption at degraded battery open circuit voltage level, $\dot{m}_f$ is the instantaneous fuel flow when the vehicle is moving, s is the trip domain distance variable, $Q_{batt}$ is the high voltage battery capacity, $V_{oc}$ is the battery open circuit voltage, and $V^h_{oc}$ is the nominal battery open circuit voltage at the highest SOC level.

Block 518 is a decision tree, if the Hamiltonian is less than or equal to the previous value, a different battery power setpoint is chosen 524 along with the recalculation of $\tau_{eng}$ and $m_f$ in blocks 510 and 514. If the Hamiltonian is less than the previous value, J2 is updated and the optimal battery power is selected 520. A check is performed in block 522 to complete all the candidate battery power sets. If all sets are complete, the Hamiltonian and $P_{batt}$ with respect to a given $V_{spd}$, $P_{whl}$, λ, and SOC, are recorded. This calculation can be accomplished real-time, or it can be calculated across all sets $V_{spd}$, $P_{whl}$, and λ by calculating the result for all permissive values 526. The result may be stored in a series of map tables as illustrated in flow diagram FIG. 5 where the resultant series of maps are illustrated in FIG. 6.

Figure 6:
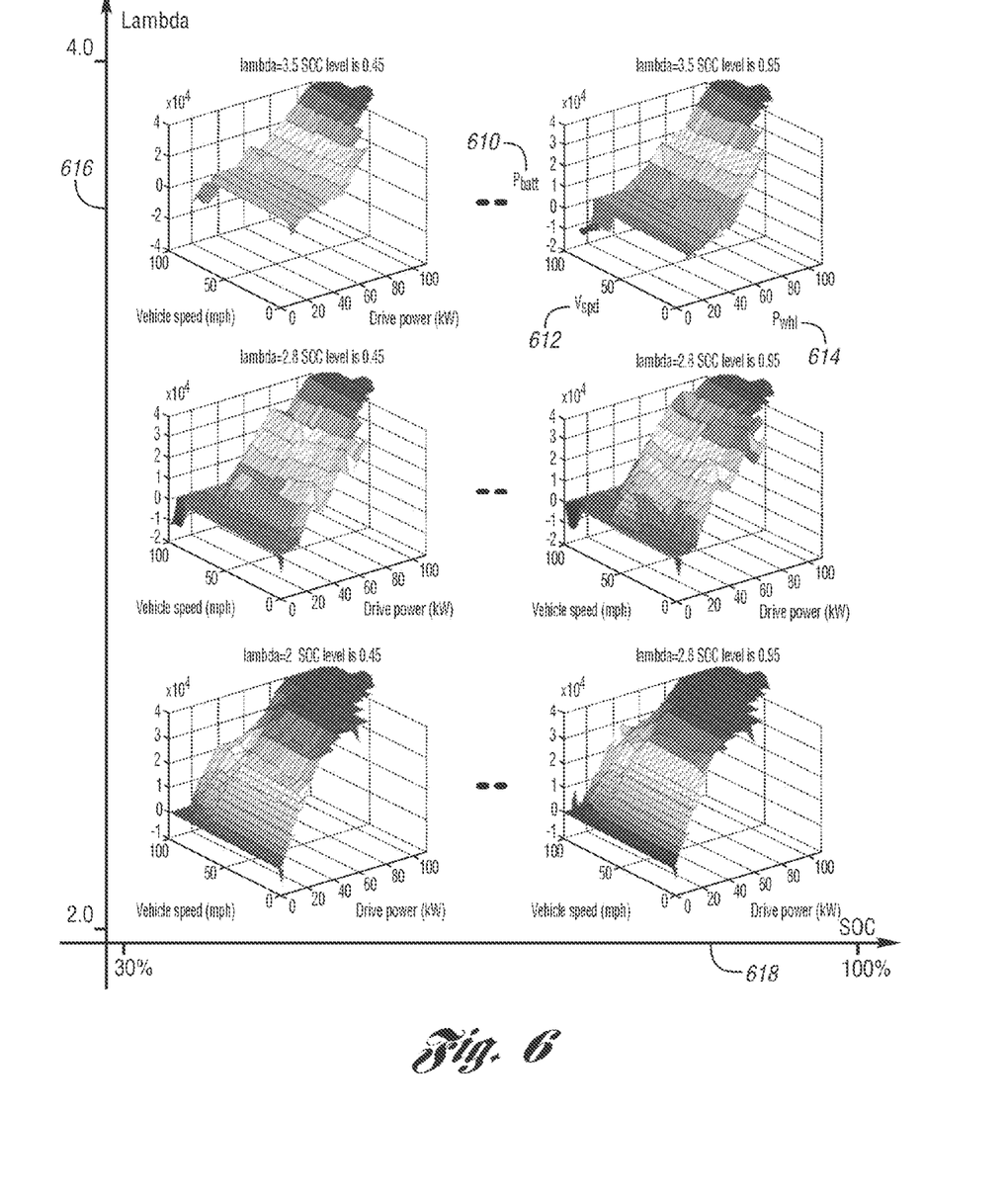
FIG. 6 illustrates battery power as a function of vehicle speed and demand power at the wheel that is determined as a function of energy consumption ratio of fuel consumption rate to electricity consumption rate with respect to battery SOC.

FIG. 6 illustrates one method of determining Pbatt 610 based on a given energy consumption ratio λ 616. In this example, vehicle speed Vspd 612, drive power request Pwhl 614, and battery state of charge SOC 618 are used along with the energy consumption ratio λ 616 to calculate Pbatt 610. In this example illustration, 6 maps are shown for 6 discrete values of the energy consumption ratio λ 616 and the battery state of charge SOC 618. Other scenarios are also possible. The use of these maps allows faster execution speed as these tables may be calibrated for a specific system. Likewise, this data can be calculated real-time.

Figure 7:
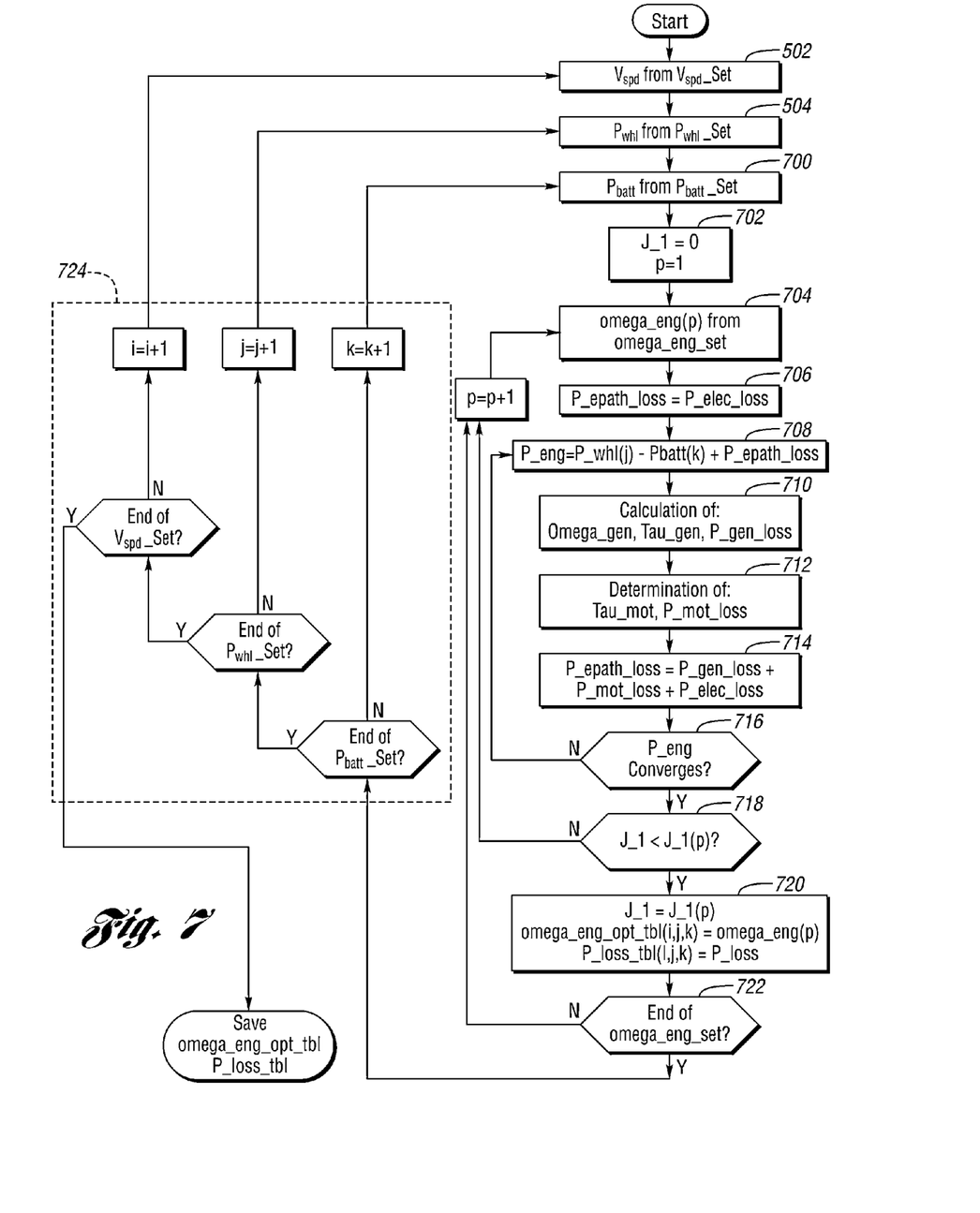
FIG. 7 is an energy management strategy flow diagram.

FIG. 7 illustrates an example for calculating the Energy Management Strategy 134 from FIG. 1. This illustrates an example flow for generating a series of map tables which can be generated offline and then accessed quickly to improve run time performance. This flow, however, can also be performed in real-time. A combination of state points including but not limited to the vehicle speed 502, operator driver power request 504, and battery power 700, where battery power $P_{batt}$ from the power sourcing distribution optimization block 130 are utilized. This calculation can be accomplished in real-time, or can be calculated across all sets $V_{spd}$, $P_{whl}$, and $P_{batt}$ by calculating the result for all permissive values 724.

In block 702, a candidate engine speed setpoint from the admissible engine speed set is chosen and the initial value of $J_I$ is set to zero. Below is an example of an equation showing the relationship between η, ω and $J_I$:

$$\max_{\omega_{eng}\in C} J_1 = \eta_{syn}(\omega_{eng})|_{\omega_{dft},r_{dft},P_{batt}} = \frac{P_{whl}}{P_{fuel}+P_{batt}}$$

Approximating the electronic power loss is illustrated in block 704, $P_{epathloss}=P_{elecloss}$ 706, and the engine power is calculated in block 708 in which the engine power can be solved using the following equation:

$$P_{eng}=P_{whl}-P_{batt}+P_{epathloss}$$

The generator torque, speed, and power loss ($\tau_{gen}$, $\omega_{gen}$, and $P_{gen\_loss}$) and the motor torque, speed, and power loss ($\tau_{mot}$, $\omega_{mot}$, and $P_{mot\_loss}$) can be calculated real-time or offline based on the subsystem properties in blocks 710 and 712 using the following equations:

$$P_{gen\_loss}=f_1g(\omega_{gen},\tau_{gen})$$

$$P_{mot\_loss}=f_1m(\omega_{mot},\tau_{mot})$$

with ω representing rotational speed and $\varrho_Q$ representing the planetary gear ratio, the kinematic relationships are $$\omega_{gen} = \frac{(1+\varrho)}{\varrho}\omega_{eng} - \frac{T_1T_2}{\varrho}\omega_{mot}$$

$$\omega_{dft} = \frac{T_2}{T_g}\omega_{mot}$$

In block 714, the electrical path power loss $P_{epath\_loss}$ is determined with the following relationship:

$$P_{epath\_loss} = P_{batt} - \omega_{gen}\tau_{gen} - \omega_{mot}\tau_{mot}$$
$$= P_{mot\_loss} + P_{gen\_loss} + P_{elec\_loss}$$

In block 716, the electric motor loss is evaluated to see if it converges. If it is converging, $J_I$, $P_{epath\_loss}$ and $\omega_{eng\_opt}$ can be updated. In block 718, the most efficient power split state of both the electrical path and the mechanical path is determined by maximizing the output power for vehicle propulsion. This is performed by maximizing the inertia of the counter shaft by maximizing the following equation:

$$\max_{\omega_{eng} \in C} J_1 = \eta_{sys}(\omega_{eng}) |_{\omega_{dft}, \tau_{dft}, P_{batt}} = \frac{P_{whl}}{P_{fuel} + P_{batt}}$$

This optimal power split state is determined using the optimal $\omega_{eng}$ and then minimizing the instantaneous fuel consumption with the following equations:

$$\omega_{eng}^* |_{u, \tau_{dft}, \omega_{dft}} = \arg\min_{\omega_{eng} \in C} H(s) = \arg\min_{\omega_{eng} \in C} \dot{m}_f^* \bigg|_u$$

$$P_{ice\_loss} = P_{fuel}(\dot{m}_f(\omega_{eng}, \tau_{eng})) - P_{eng}$$

This flow of equations can be calculated in real-time or can be calculated as table maps and stored in memory to reduce run-time computational load. If table maps are desired, the flow would follow block 720 and the flow within 722 for the complete set of permissible values of $\omega_{eng}$. This calculation can be accomplished in real-time, or it can be calculated across all sets $V_{spd}$, $P_{whl}$, and $P_{batt}$ by calculating the result for all permissive values 724. The values for $\omega_{eng}$ and $P_{eng}$ are then saved and forwarded to the Powertrain control module 100.

Figure 8:
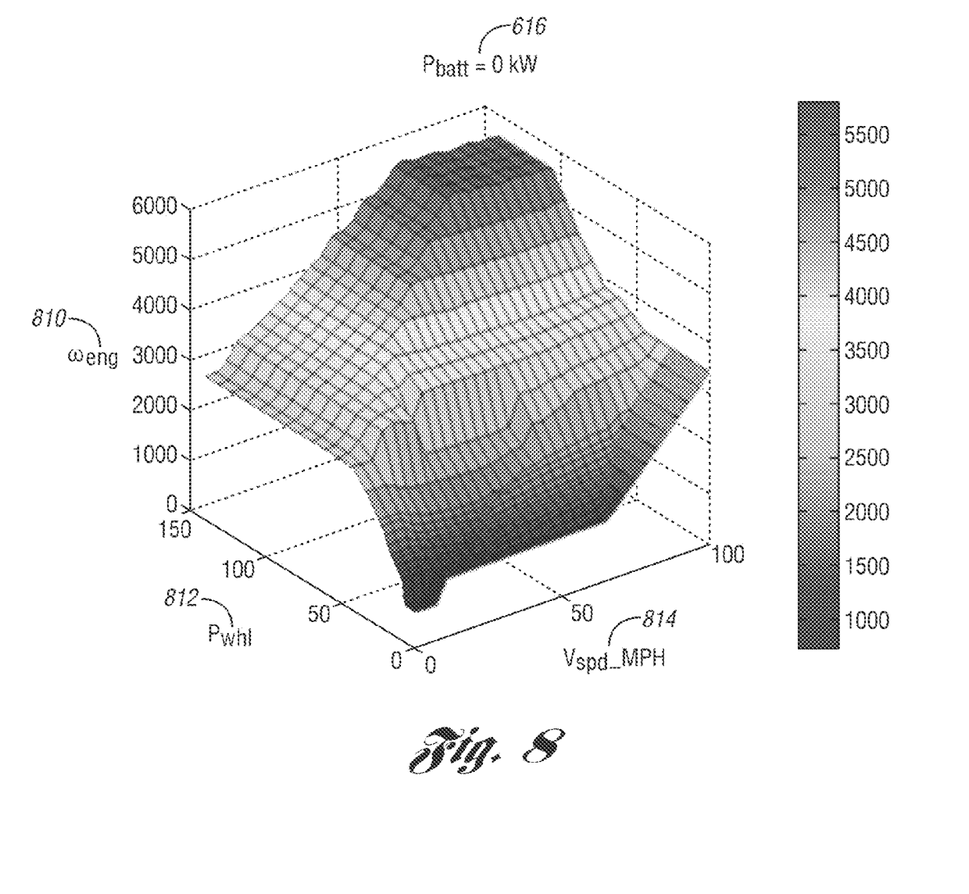
FIG. 8 illustrates an optimal engine speed map as a function of vehicle power versus vehicle speed.

FIG. 8 illustrates optimal engine speed $\omega_{eng}$ 810 as a function of drive power request $P_{whl}$ 812, vehicle speed $V_{spd}$ 814, and battery power $P_{batt}$ 616. This can be calculated in real-time or can be calculated for a specific battery power $P_{batt}$ 616 as illustrated. The use of these maps allows faster execution speed as these tables may be calibrated for a specific system.

The mechanical power transfer loss is not relevant in this calculation as the internal combustion engine loss $P_{ice-loss}$ and the electrical power transfer loss $P_{epath-loss}$ dominate the total power loss in PHEV operations. In the above equations, $P_{whl}$ is the drive power request at wheels, $P_{fuel}$ is the total power supplied from the fuel at current fuel flow rate, $P_{batt}$ is the battery power that takes positive sign for discharge and negative sign for charge, and $P_{loss}$ is the PHEV system power transfer loss. The overall PHEV system's operating point is externally determined by the driveshaft torque $\tau_{dft}$ that is propelling the vehicle at the current driveshaft rotational speed $\omega_{dft}$.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A plug-in hybrid electric vehicle comprising:
an engine;
an electric machine having a torque limit;
a battery having a charge-depletion-to-charge-sustaining transition threshold and an initial state of charge at a beginning of a trip greater than the threshold; and
at least one controller programmed to operate the engine and electric machine
such that a state of charge of the battery achieves approximately the charge-depletion-to-charge-sustaining transition threshold after the vehicle has been driven, during the trip, a distance greater than a specified distance, wherein the specified distance is a total distance the vehicle could have been driven exclusively by the electric machine until the state of charge achieves approximately the charge-depletion-to-charge-sustaining transition threshold while a total torque demand remains less than or equal to the torque limit, and
according to a plurality of specified ratios of fuel consumption rate for the engine to energy consumption rate for the electric machine such that the state of charge achieves approximately the charge-depletion-to-charge-sustaining transition threshold after the vehicle has been driven the distance greater than the specified distance, and wherein the specified ratios of fuel consumption rate for the engine to enemy consumption rate for the electric machine correspond to a plurality of segments of the trip.

2. The vehicle of claim 1 wherein the at least one controller is further programmed to operate the electric machine and battery in charge depletion mode while the vehicle is being driven the distance greater than the specified distance.

3. The vehicle of claim 1 wherein each of the specified ratios of fuel consumption rate for the engine to enemy consumption rate for the electric machine is based on at least one characteristic of the corresponding segment of the trip.

4. The vehicle of claim 3 wherein the at least one characteristic includes road type, road grade, posted speed, traffic, day of the week, or time of day.

5. A method for controlling a vehicle comprising: operating an engine and electric machine, by a vehicle system controller, based on a plurality of specified ratios of engine fuel consumption rate to electric machine energy consumption rate such that a state of charge of a battery generally decreases and then achieves approximately a charge-depletion-to-charge-sustaining transition threshold after the vehicle has been driven a distance greater than the vehicle's pure electrical range.

6. The method of claim 5 further comprising operating the engine and electric machine such that the state of charge achieves approximately the charge-depletion-to-charge-sustaining transition threshold near the end of the vehicle's route but not before.

7. A vehicle comprising:
an engine;
an electric machine;
a battery; and
at least one controller programmed to start or stop the engine according to a specified ratio of fuel consumption rate for the engine to energy consumption rate for the electric machine for each of a plurality of segments of a route such that a state of charge of the battery generally decreases at a desired rate until the state of charge achieves a charge-depletion-to-charge-sustaining transition threshold and to, in response to the state of charge achieving the charge-depletion-to-charge-sustaining transition threshold, operate the engine to maintain the state of charge at approximately the charge-depletion-to-charge-sustaining transition threshold for a balance of the route.

8. The vehicle of claim 7 wherein the plurality of segments defines a distance greater than a total distance the vehicle could have been driven exclusively by the electric machine until the state of charge achieves approximately the charge-depletion-to-charge-sustaining transition threshold while a total torque demand remains less than or equal to a torque limit of the electric machine.

9. The vehicle of claim 7 wherein the plurality of segments defines a distance greater than a pure electrical range of the vehicle.

10. The vehicle of claim 7 wherein the at least one controller is further programmed to start or stop the engine such that the state of charge achieves approximately the charge-depletion-to-charge-sustaining transition threshold near the end of the route.

11. The vehicle of claim 7 wherein each of the specified ratios of fuel consumption rate for the engine to energy consumption rate for the electric machine is based on at least one characteristic of the corresponding segment of the route.

12. The vehicle of claim 11 wherein the at least one characteristic includes road grade, posted speed, traffic, day of the week, or time of day.

* * * * *